United States Patent [19]
Guyton

[11] 3,955,592
[45] May 11, 1976

[54] CHECK VALVE
[76] Inventor: Glen B. Guyton, 3401 E. Newton, Tulsa, Okla. 74115
[22] Filed: May 21, 1975
[21] Appl. No.: 579,502

Related U.S. Application Data
[62] Division of Ser. No. 415,742, Nov. 14, 1973.

[52] U.S. Cl. .............................. 137/329; 137/527.4; 137/527.8
[51] Int. Cl.² ......................................... F16K 15/03
[58] Field of Search............. 137/527, 527.2, 527.4, 137/527.6, 527.8, 516, 269.5, 270, 269, 271, 329; 251/147, 298, 290

[56] References Cited
UNITED STATES PATENTS

| | | | |
|---|---|---|---|
| 846,317 | 3/1907 | Kiddle............................. | 137/527.4 |
| 849,466 | 4/1907 | Donaldson, Jr.............. | 137/527.8 X |
| 2,918,934 | 12/1959 | Wheatley......................... | 137/527.2 |

*Primary Examiner*—William R. Cline
*Attorney, Agent, or Firm*—Head, Johnson & Chafin

[57] ABSTRACT

A check valve comprising a sectional valve body adapted to be interposed in a flow line, a valve seat provided in one body portion, a pivotal clapper member movable toward and away from said valve seat to provide alternate open and closed positions for the valve and hanger means provided in the body including means for urging the clapper toward a normal closed position against the valve seat.

2 Claims, 10 Drawing Figures

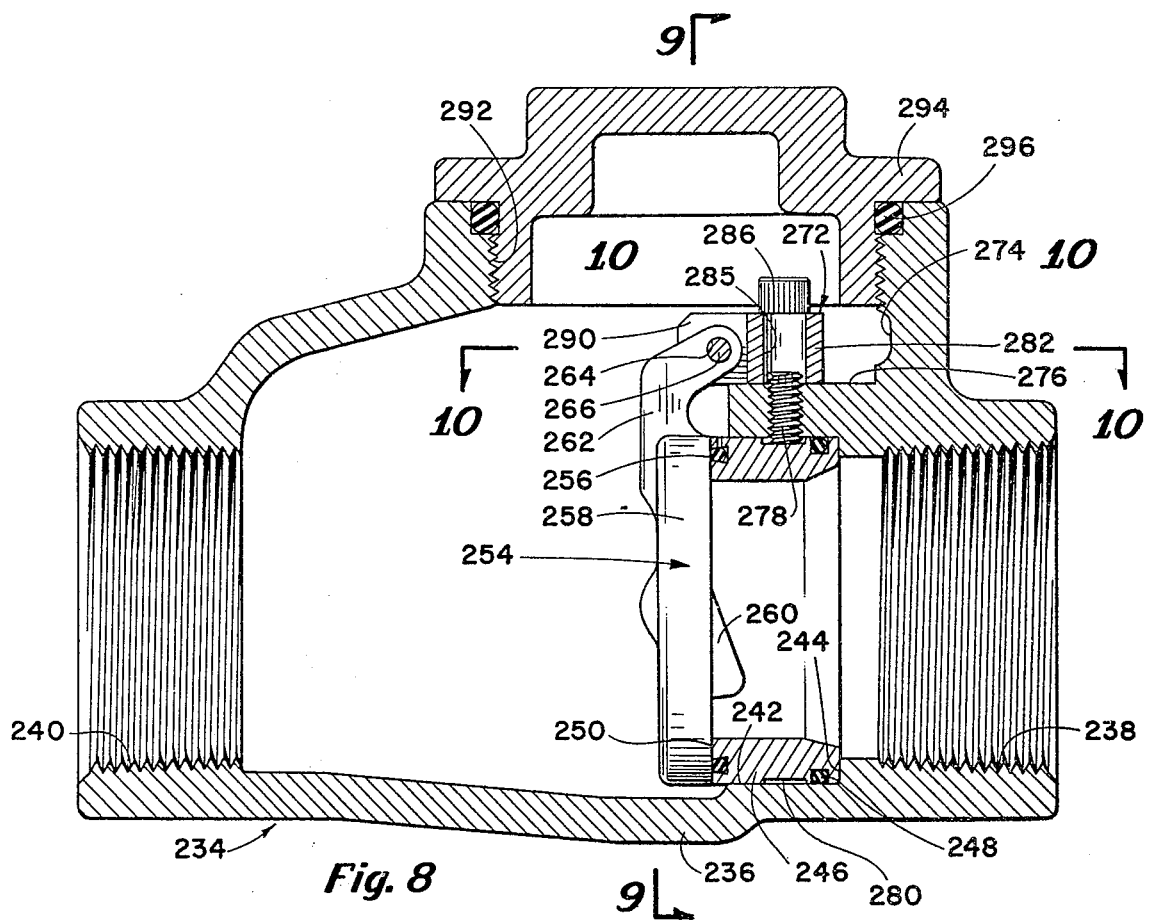
Fig. 8
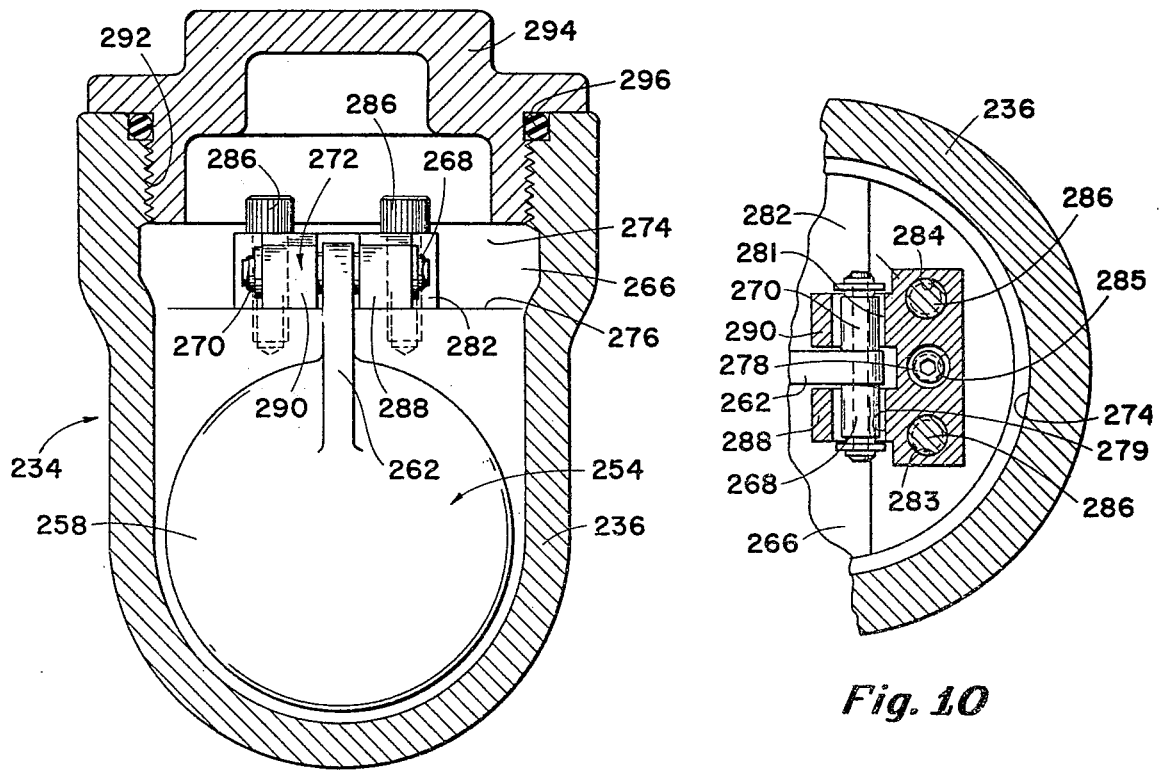
Fig. 9
Fig. 10

CHECK VALVE

This is a division of application Ser. No. 415,742, filed Nov. 14, 1973.

BACKGROUND OF THE INVENTION

1. Field of the Invention

This invention relates to improvements in check valves and more particularly, but not by way of limitation, to a check valve particularly designed and constructed for facilitating repair and maintenance of the valve when worn or otherwise damaged.

2. Description of the Prior Art

Check valves are old and well known for use in flow lines wherein it is desirable to permit fluid flow in one direction and preclude fluid flow in an opposite direction. However, there are still many disadvantages in check valves available today in that the repair and servicing thereof is frequently very expensive and, in fact, it may be necessary to completely replace a check valve when it has become worn or damaged.

SUMMARY OF THE INVENTION

The present invention contemplates a novel check valve particularly designed and constructed for overcoming the above disadvantages. The novel valve comprises a sectional valve body adapted to be interposed in a flow line. A valve seat is provided in one body portion for cooperating with a pivotal closure or clapper member to provide alternate open and closed positions for the valve. The clapper member is provided with a pivot shaft removably secured to the valve body by a hanger means whereby the clapper member may be readily removed from the valve body for repair, or the like, and easily replaced in the valve body for restoration of normal service for the valve. The hanger means is constructed in a manner for constantly urging the clapper member in a direction toward the valve seat in order to provide a normally closed position for the valve. The valve seat may be removable, if desired, for facilitating repair thereof. In addition, a plurality of hanger sections may be provided on one body portion indexed with respect to each other for orientation between the valve body sections in a manner whereby a new hanger section may be utilized with the clapper member when the clapper member has been repaired and replaced on the valve body. The novel check valve is simple and efficient in operation and economical and durable in construction.

BRIEF DESCRIPTION OF THE DRAWINGS

FIG. 8 is a sectional elevational view of another still modified check valve embodying the invention.

FIG. 9 is a view taken on line 9—9 of FIG. 8.

FIG. 10 is a view taken on line 10—10 of FIG. 8.

DESCRIPTION OF THE PREFERRED EMBODIMENTS

Figure 1:
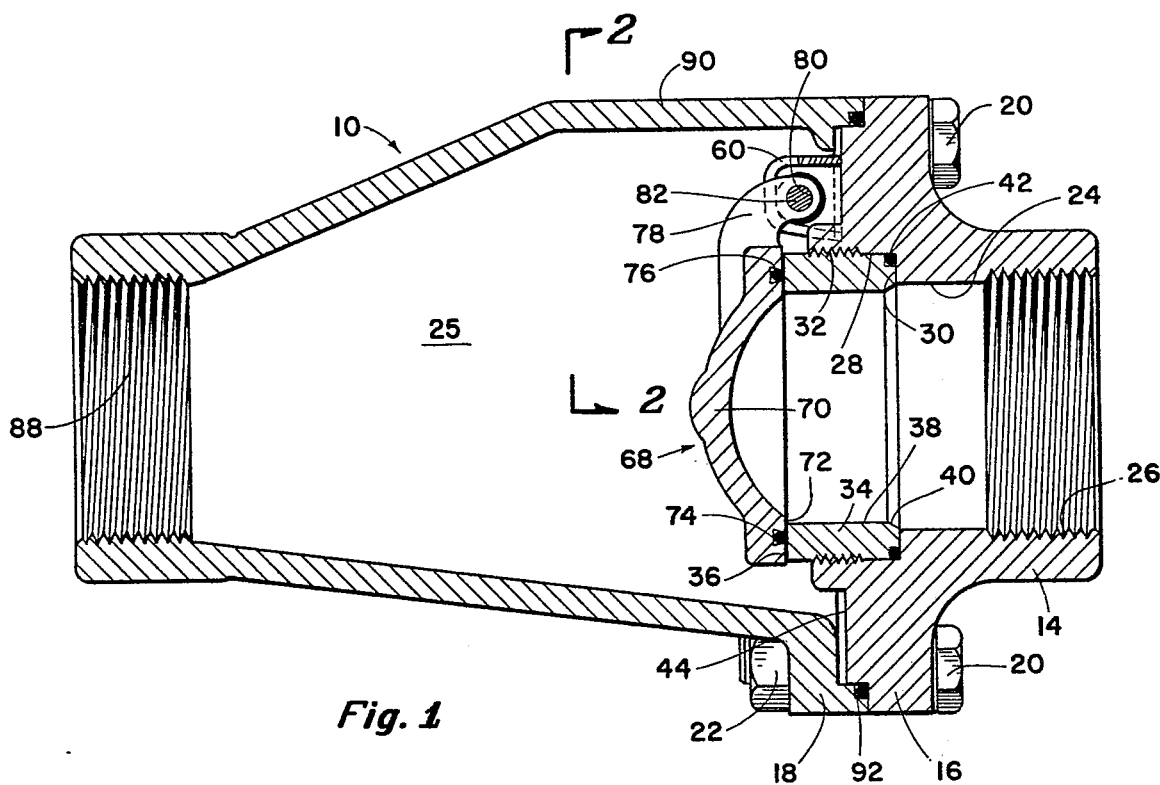
FIG. 1 is a sectional elevational view of a check valve embodying the invention.
Figure 2:
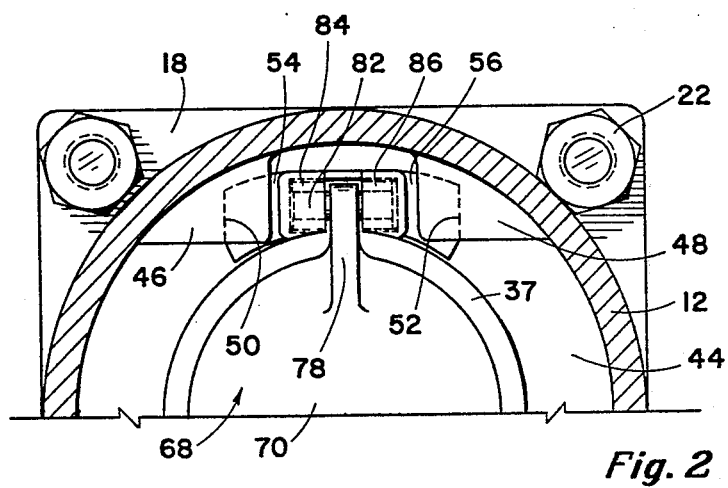
FIG. 2 is a view taken on line 2—2 of FIG. 1.
Figure 3:
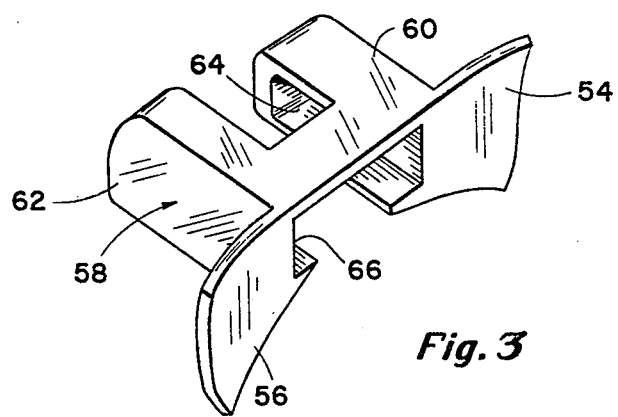
FIG. 3 is a perspective view of a hanger section in a check valve embodying the invention.

Referring to the drawings in detail, and particularly FIGS. 1, 2 and 3, reference numeral 10 generally indicates a check valve comprising a first valve body 12 removably secured in substantial longitudinal alignment with a second valve body 14 in any suitable manner. As shown herein, the body sections 12 and 14 are provided with outwardly extending flanges 16 and 18, respectively, disposed in abutting relationship and secured together by bolts 20 and lock nuts 22, as is well known. The body portion or section 14 is provided with a central bore 24 extending therethrough to provide a fluid passageway in communication with the interior chamber 25 of the body portion 12. The outer end of the bore 24 may be threaded as shown at 26, if desired, for threaded engagement with a suitable coupling, flange fitting, or the like (not shown). The bore 24 is enlarged at 28 oppositely disposed from the threaded portion 26 to provide an annular shoulder 30. The enlarged bore portion 28 is threaded at 32 for removably receiving a sleeve 34 therein.

One end of the sleeve 34 bears against the shoulder 30, and the opposite end 36 thereof and may either be in substantial planar alignment with a cylindrical flange 37 provided on the body 14 or may extend into the chamber 25 beyond the body 14 to provide a valve seat for the valve 10. The inner bore 38 of the sleeve 34 may be of a diameter substantially equal to the diameter of the bore 24, or as shown herein, the diameter of the bore 38 may be of a diameter slightly less than the diameter of the bore 24. In this event, a suitable bevel 40 may be provided on the inner periphery of the sleeve 34 extending between the bores 24 and 38, as clearly shown in FIG. 1. Of course, if the diameter of the bore 38 is slightly greater than the diameter of the bore 24, a bevel (not shown) may be provided at the juncture of the bore 24 and the shoulder 30 and extending between the bore 24 and the bore 38. Suitable sealing means, such as an O-ring 42, or the like, may be interposed between the sleeve 34 and the body 14 for precluding leakage of fluid therebetween. In addition, a plurality of circumferentially spaced recesses (not shown) may be provided around the outer periphery of the valve seat 36, if desired, for facilitating installation and removal of the sleeve 34 from the bore 28, as is well known.

The body 14 is provided with an annular shoulder 44 extending circumferentially outwardly from the flange 37 for receiving the flange 18 thereagainst. A pair of oppositely disposed inwardly directed spaced ears 46 and 48 are provided on the inner periphery of the body 12 in the proximity of the flange 18 and are disposed in the upper portion of the body 12 as viewed in FIGS. 1 and 2. The ears 46 and 48 are provided with laterally extending recesses 50 and 52, respectively (FIG. 2) on the inward edges thereof for removably receiving the ends of oppositely disposed flanges 54 and 56 of a hanger member 58. The flanges 54 and 56 are of a substantially arcuate normal configuration in the longitudinal direction thereof as shown in FIG. 3 and are relatively thin in order that they will be slightly yieldable or flexible. When the flanges 54 and 56 are disposed within the recesses 46 and 48, and the flange 18 is secured against the flange 16, the flanges 54 and 56 will be brought into a pressure engagement with the shoulder 44. This pressure will tend to straighten the flanges 54 and 56 against the normal arcuate configuration thereof, which provides a "spring-like" force for securely retaining the flanges 54 and 56 in position with the relative recesses 44 and 46.

The hanger member 58 also comprises a pair of spaced oppositely disposed bosses 60 and 62 extending substantially perpendicular from the flanges 54 and 56 and in a direction away from the body 14. The spaced inwardly directed faces of the bosses 60 and 62 are provided with longitudinally extending recesses or grooves 64 and 66, each having one end open at the respective flange 54 and 56, and the opposite end thereof closed as clearly shown in FIG. 3. In addition, the lower surface of the recesses 64 and 66, as viewed in FIGS. 1 and 3, tapers downwardly in a direction toward the flanges 54 and 56 at an angle of approximately ten degrees, but not limited thereto, for a purpose as will be hereinafter set forth.

A clapper or closure member generally indicated at 68 is pivotally secured to the hanger member 58 in a manner as will be hereinafter set forth, and cooperates with the valve seat 36 to provide alternate open and closed positions for the valve 10. The clapper member 68 may be of any suitable configuration, and as shown herein comprises a substantially circular body 70 of an arcuate cross sectional configuration, or substantially dish shaped configuration, having an annular shoulder 72 on the outer periphery thereof adapted to engage the valve seat 36 in the closed position of the valve 10. A suitable sealing member, such as an O-ring 74, is disposed in an annular groove 76 provided on the shoulder 72 for engaging the seat 36 to preclude leakage of fluid in the closed position of the valve. Of course, if desired, the sealing member may be disposed in the valve seat 36 instead of on the clapper member 68.

A radially extending angular arm 78 is rigidly secured to the clapper body 70 in any well known manner (not shown) or may be integral therewith as shown herein as desired. The outer end of the arm 78 is provided with a bore 80 extending transversely therethrough for receiving a pivot shaft 82 therein. The arm 78 may be secured to the outer periphery of the shaft 82 in any suitable manner (not shown) for rotation about the longitudinal axis of the shaft 82, as is well known, and the opposite ends of the shaft 82 are journalled in suitable bushings 84 and 86. The bushings 84 and 86 are disposed within the recesses 64 and 66, respectively, with the shaft 82 spanning the distance therebetween. The arm 78 is disposed between the bosses 60 and 62 and pivotally supports the clapper 68 within the chamber 25. Due to the slope of the recesses 64 and 66 in the direction toward the body 14, the force of gravity causes the bushings 84 and 86 to slide within the recesses 64 and 66 into a position whereby the pivot axis of the shaft 82 is offset from the center of gravity of the clapper 68, thus causing the clapper 68 to be constantly urged in a direction toward the valve seat 36, providing a normal closed position for the valve 10.

Whereas in the particular embodiment depicted in FIGS. 1 and 2 the arm 78 is rigidly secured to the shaft 82 for simultaneous rotation therebetween, it will be apparent that the pivot shaft 82 may be stationary or fixed within the hanger 68 and the arm 78 may be suitably journalled thereon for rotation about the pivot axis thereof.

The body 12 is of a substantially bell shaped configuration having a threaded bore 88 provided at the end thereof opposite the flange 18, and disposed in substantial axial alignment with the bore 26 for cooperating therewith to interpose the valve 10 in a flow line, or the like (not shown). The housing 12 is enlarged in the upper portion thereof in the proximity of the hanger member 68, as shown at 90 to provide clearance within the chamber 25 for a freedom of movement for the clapper member 68 during opening of the valve 10. In this manner, the clapper member 68 may be of the full opening type, providing a full flow of fluid through the valve 10 in the open position thereof. In addition, it is preferable to provide a suitable sealing member 92 between the flanges 16 and 18 for precluding leakage of fluid therebetween. Of course, suitable bleed port means (not shown) may be provided in the body 12 in communication with the chamber 25, if desired.

In operation, the clapper member 68 is normally disposed against the valve seat 36 to provide a normally closed position for the valve 10. As hereinbefore set forth, the offset position of the axis of the pivot shaft 82 with respect to the axis of gravity of the clapper 68 causes the clapper 68 to be constantly urged into a seating engagement with the valve seat 36. When the pressure on the upstream side of the clapper 68 becomes sufficiently great, the clapper 68 will pivot about the axis of the shaft 82 for opening the valve 10 and permitting a substantially unrestricted flow of fluid therethrough. When the upstream pressure drops sufficiently, the weight of the clapper 68 combined with the offset position of the pivot axis will cause the clapper 68 to return to the normal closed position for precluding back flow or reverse flow of fluid therethrough.

In the event the clapper 68 or seat 36 become worn or otherwise damaged, the valve 10 may be removed from the flow line in any suitable manner (not shown) and the valve bodies 12 and 14 may be quickly and easily separated. When the body sections 12 and 14 have been separated, the pressure of the shoulder 44 against the flanges 54 and 56 of the hanger member 58 will be released and the hanger member 58 may be easily removed from the recesses 50 and 52 of the body 12. The bushings 84 and 86 may then be removed from the recesses 64 and 66 to remove the clapper 68 from the hanger section 58. Any repair or maintenance work, such as facing of the shoulder 72, or the like, may be performed on the clapper 68 in the usual manner. The clapper 68 may then be reinstalled in the hanger member 58.

In addition, the sleeve 34 may be readily removed from the body 14 by unthreading the connection 32 therebetween in any well known manner. Any repair or maintenance work on the sleeve 34, such as facing the valve seat 36, or the like, may be readily accomplished in the usual manner. The sleeve 36 may then be easily reinserted in the body 14 and the body sections 12 and 14 may be reassembled for installation in the flow line (not shown).

It will be apparent that facing of the shoulder 72 of the clapper 68 and/or the valve seat 36 will change the dimensional relationship between the clapper 68, valve seat 36, and body sections 12 and 14, thus effecting the efficient sealing of the clapper 68 against the valve seat 36 in the closed position of the valve 10. The slope of the recesses 64 and 66 provides a compensation for any such dimensional variance by permitting the bushings 84 and 86 to seek a position in the recesses 64 and 66 whereby the shoulder 72 of the clapper 68 is in an efficient sealing engagement with the valve seat 36 in the closed position of the valve 10.

Figure 4:
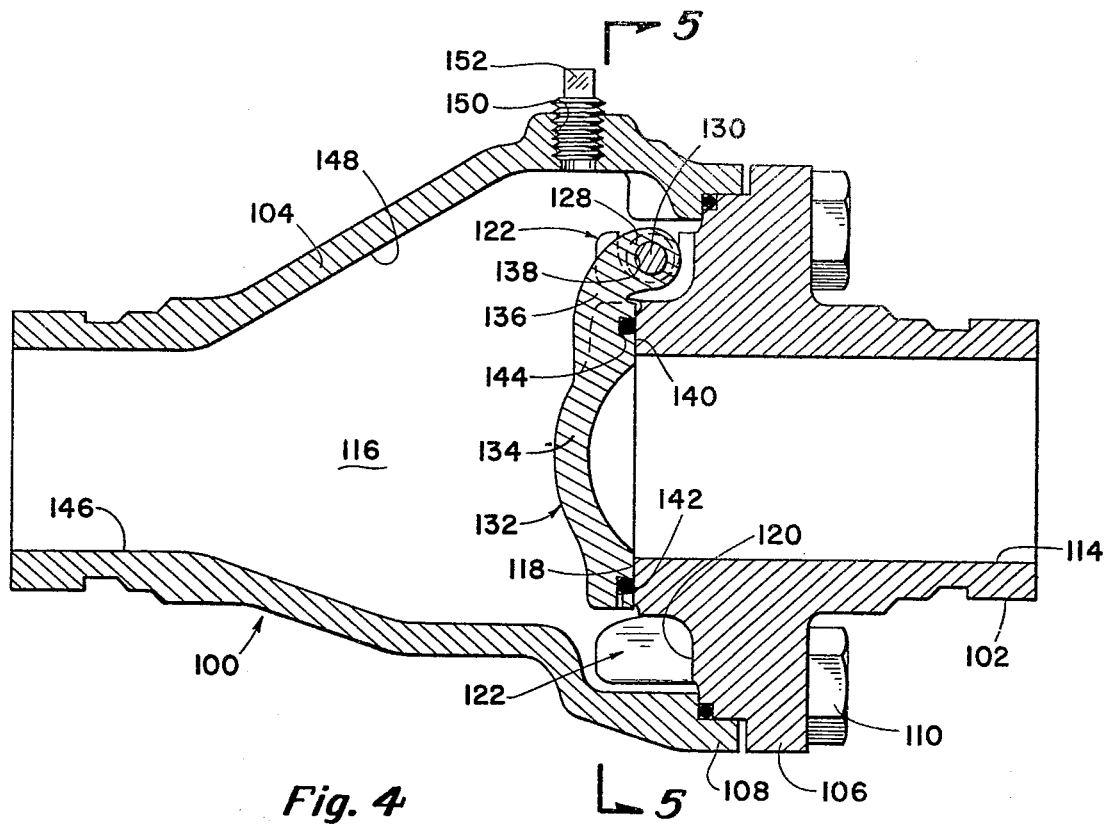
FIG. 4 is a sectional elevational view of a modified check valve embodying the invention.
Figure 5:
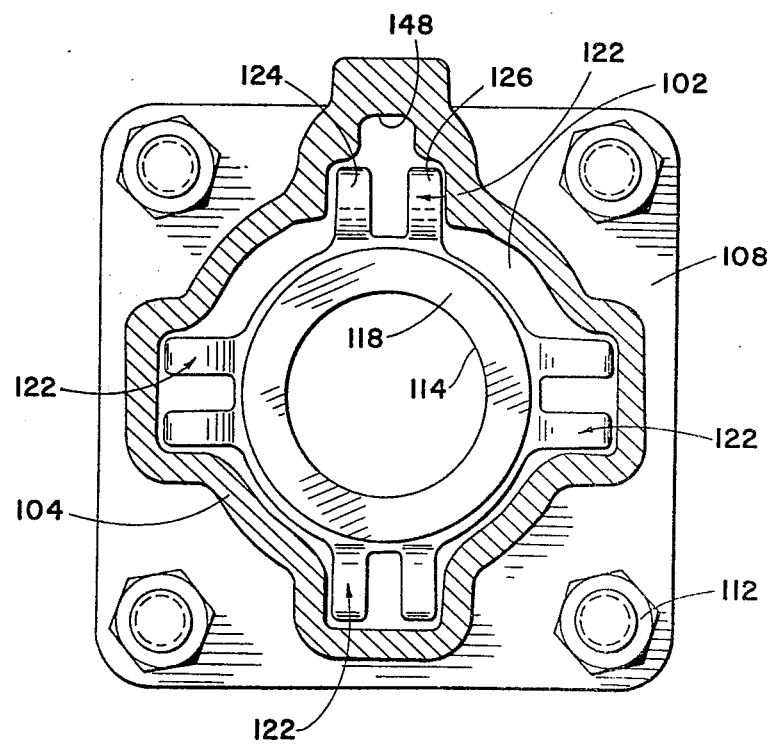
FIG. 5 is a view taken on line 5—5 of FIG. 4 with portions thereof omitted for purposes of illustration.

Referring now to FIGS. 4 and 5, reference numeral 100 generally indicates a modified check valve comprising a pair of longitudinally separable valve body sections 102 and 104 adapted to be interposed in a flow line (not shown) in any suitable manner. The valve bodies or housings 102 and 104 may be removably secured in end to end relation in any well known manner and as shown herein the bodies 102 and 104 are provided with complementary flanges 106 and 108, respectively, retained in abutting relationship by a plurality of spaced bolts 110 and lock nuts 112.

The body 102 is preferably substantially cylindrical and is provided with a central bore 114 extending longitudinally therethrough to provide communication with the interior chamber 116 of the valve body 104. An annular shoulder 118 is provided on the inwardly directed end of the body 102 to provide a valve seat for the valve 100. An outwardly extending radial shoulder 120 is provided on the outer periphery of the body 102 and is interposed between the flange 106 and valve seat 118 as clearly shown in FIG. 4. A plurality of circumferentially spaced hanger sections 122 are rigidly secured to the outer periphery of the body 106 in any suitable manner, or as shown herein may be integral therewith.

Whereas substantially any number of the hanger sections 122 may be provided, as shown in FIG. 5 four of the hanger sections are provided on the body 102 and spaced substantially 90° apart. Each hanger section 102 preferably extends from the shoulder 120 to a point within the chamber 116 beyond the valve seat 118. Each successive hanger 122 preferably extends into the chamber 116 a slightly greater distance from the valve seat 118 than the preceding hanger 122, or the distance of protrusion of the hangers 122 into the chamber 116 may be varied in any suitable arrangement for a purpose as will be hereinafter set forth.

Each hanger section 122 preferably comprises a pair of spaced arcuate fingers 124 and 126 having the outer portions thereof open for receiving suitable bushings 128 (only one of which is shown in FIG. 4) therein. The bushings 128 are fixedly secured or otherwise disposed on the opposite ends of a pivot shaft 130 which spans the distance between the fingers 124 and 126.

A clapper member or closure member 132, generally similar to the clapper member 68, and comprising a substantially circular body 134 having a radially extending angled shaft or arm 136 secured thereto or integral therewith, is provided for the valve 100. The outer end of the arm 136 is provided with a transversely extending bore 138 for receiving the pivot shaft 130 therethrough. The arm 136 may be secured to the outer periphery of the shaft 130 between the bushings 128 in any suitable manner for rotation simultaneously therewith and is disposed between the fingers 124 and 126 for pivotally securing the clapper 132 to the body 102 to provide alternate open and closed positions for the valve 100.

As hereinbefore set forth, the clapper member 132 is preferably similar to the clapper 68, and is provided with an annular shoulder 140 around the outer periphery thereof for engagement with the valve seat 118 to provide the closed position for the valve 100. A suitable sealing member, such as an O-ring 142, or the like, is disposed within an annular groove 144 provided on the shoulder 140, and the sealing member 142 engages the valve seat 118 in the closed position of the valve for precluding leakage of fluid therebetween. Of course, the sealing member 142 may be disposed in the valve seat 118, if desired, instead of in the clapper 132.

The valve body 104 is preferably of a substantially bell-shaped configuration and is provided with an internal bore 146 in substantial alignment with the bore 114 for providing a fluid passageway through the valve 100 in the open position thereof. The body 104 is enlarged at one side thereon in the proximity of one of the hanger sections 122 as shown at 148 to provide clearance for the clapper member 132 in the open position thereof. In addition, a pair of spaced ears 147 and 149 are provided in the body 104 conterminous with the recess 148 to retain the bushings 128 in position, particularly if the bushings 128 are freely mounted on the shaft 130. When the fluid pressure upstream from the clapper member 132 becomes sufficiently great, the clapper will pivot about the longitudinal axis of the shaft 130 to an open position for permitting the flow of fluid through the valve 10. The enlarged portion of 148 permits the clapper 132 to move into a substantially full open position for providing a maximum fluid flow through the valve 10. In addition, a bleed port 150, or the like, may be provided in the enlarged portion 148 for removably receiving a suitable plug member 152 therein as is well known.

The hanger sections 122 are preferably disposed on the body 102 in such a manner that the longitudinal axis of the shaft 130 disposed therein will be offset with respect to the center of gravity of the clapper member 132, thus gravity will constantly urge the claapper 132 toward the closed position thereof against the valve seat 118, to assure a normal closed position for the valve 100.

When the valve 100 is installed in a flow line (not shown), the clapper member 132 is normally engaged with the valve seat 118 for efficiently closing the valve. When the upstream pressure becomes sufficiently great for overcoming the weight of the clapper 132 and the downstream fluid pressure, the clapper 132 will be pivoted in a direction away from the seat 118 to open the valve. When the upstream pressure drops below the opening pressure, the weight of the clapper combined with the offset position of the pivot axis of the shaft 130 will close the clapper 132 against the valve seat 118 for efficiently closing the valve.

In the event the valve 100 must be repaired, the valve may be removed from the flow line in any well known manner and the body sections 102 and 104 may be separated by removal of the bolts 110 and lock nuts 112. When the bodies 102 and 104 have thus been separated, the clapper 132 may be easily removed from engagement with the hanger section 122 whereupon suitable repair or maintenance work may be performed on the clapper, such as facing of the shoulder 140. In addition, the valve seat 118 of the body 102 may be serviced if desired, such as by facing of the valve seat 118. Subsequent to the repair operation or operations the clapper 132 may be reinstalled on the body 102 and the body sections 102 and 104 may be secured together as hereinbefore set forth. The valve 100 may then be reinstalled in the flow line as desired.

It will be apparent that the facing of the shoulder 140 and/or valve seat 118 will alter the relative dimensions of the clapper 132 and body 102. In order to compensate for this variance, the body 102 may be indexed with respect to the body 104 to position a second hanger section 122 in the proximity of the enlarged area 148, said second hanger section being of the proper extension beyond the valve seat 118 to accomodate the clapper member 132 in the correct orientation with respect to the valve seat 118 for assuring an efficient closing action therebetween.

Figure 6:
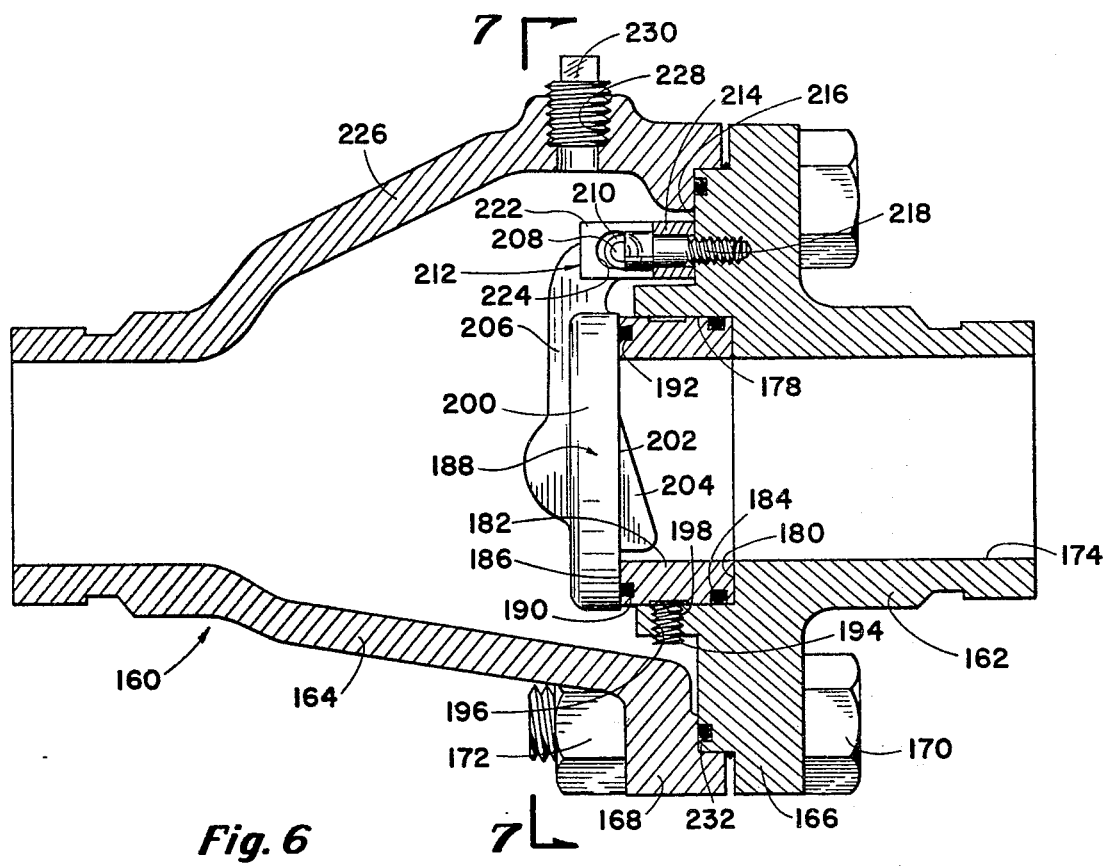
FIG. 6 is a sectional view of another modified check valve embodying the invention.
Figure 7:
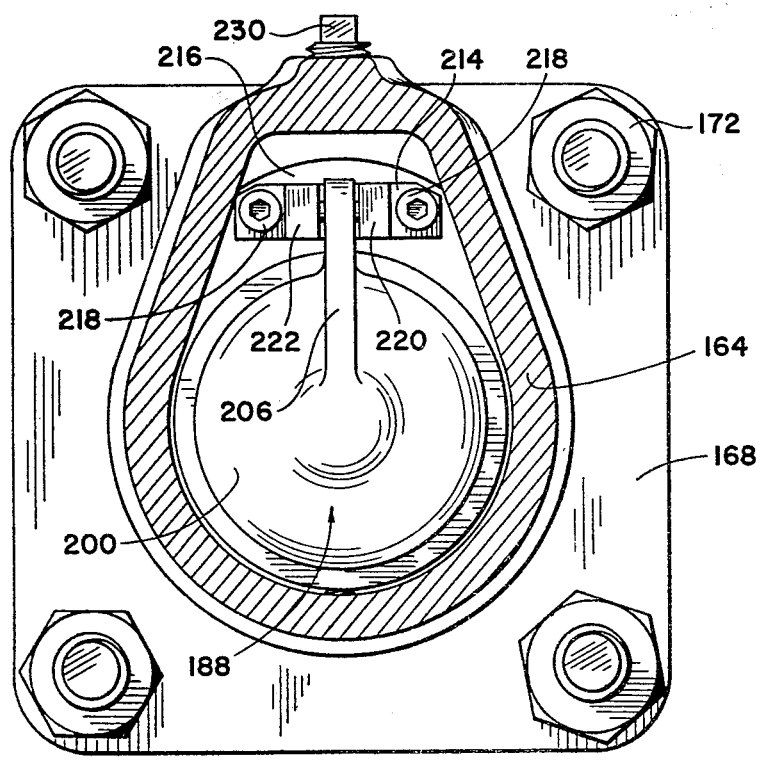
FIG. 7 is a view taken on line 7—7 of FIG. 6.

Referring now to FIGS. 6 and 7 reference character 160 generally indicates a check valve similar to the valves 10 and 100. The valve 160 comprises a pair of valve bodies 162 and 164 removably secured together in end to end relation in any suitable manner. As shown herein the valve bodies 162 and 164 are provided with complementary outwardly extending flanges 166 and 168, respectively, retained in abutting relationship by a plurality of spaced bolts 170 and lock nuts 172.

The valve body 162 is substantially cylindrical and is provided with a central bore 174 extending longitudinally therethrough to provide communication with the interior 176 of the body 164. The bore 174 is enlarged at 178 to provide an annular shoulder 180 for receiving a removable sleeve 182 thereagainst. Suitable sealing means such as an O-ring 184 is interposed between the sleeve 182 and the bore 178 for precluding leakage of fluid therebetween. The free end 186 of the sleeve 182 preferably extends beyond the body 162 to provide a valve seat for the valve 160 and a clapper member 188 is pivotally secured to the body 162 in a manner as will be hereinafter set forth for cooperating with the valve seat 186 to provide alternate open and closed positions for the valve 162. A suitable sealing member 190 may be disposed within an annular groove 192 provided on the valve seat 186 for engaging the clapper member 188 in the closed position thereof to preclude leakage of fluid. Of course, the sealing means may be provided on the clapper member rather than on the valve seat, if desired.

As hereinbefore set forth, the sleeve 182 is removably disposed in the bore 178 and may be retained in position therein by means of a set screw 194. The set screw 194 extends through a radially extending threaded bore 196 provided in the body 162 and engages the bottom of an annular recess 198 provided on the outer periphery of the sleeve 182. The bottom of the recess 198 may be tapered (not shown) for cooperating with the screw 194 to urge the sleeve 182 in a direction toward the shoulder 180. The sleeve 182 may be removed from and replaced in the bore 178 in any suitable manner (not shown) when desired.

The clapper member 188 as shown herein comprises a substantially circular disc 200 having a substantially flat face 202 on one side thereof adapted to engage the valve seat 186 in the closed position of the valve 162. A suitable extension member 204 is provided on the face 202 and an angled arm 206 is provided on the opposite side thereof. The outer end of the arm 206 is provided with a transversely extending bore (not shown) for receiving a pivot shaft 208 therethrough. Suitable bushings 210 (only one of which is shown in FIG. 6) are disposed on the opposite ends of the shaft 208, and the bushings 210 are disposed within a hanger member generally indicated at 212, and which is secured to the body 162 in a manner as will be hereinafter set forth. The longitudinal axis of the pivot shaft 210 is preferably in substantial alignment with the plane of the face 202 of the clapper member 188, but offset with respect to the axis of gravity of the clapper 188 whereby the weight of the clapper combined with the weight of the member 204 constantly urges the clapper 188 in a direction toward the valve seat 186 to provide a normally closed position for the valve 160.

The hanger member 212 comprises a substantially flat bar member 214 removably secured to the inwardly directed face 216 of the flange 166 by a plurality of bolts 218. A pair of outwardly extending space boss members 220 and 222 are provided on the bar 214 and are provided with aligned bores 224 (only one of which is shown in FIG. 6) for receiving the bushings 210 therein. The arm 206 of the clapper 188 is disposed between the bosses 220 and 222 and the pivot shaft 208 and bushings 210 retained in the hanger member 212 for pivotally securing the clapper 188 to the body 162. In addition, the bores 224 of the bosses 220 and 222 are slightly elongated as particularly shown in FIG. 6 and the bottom surfaces of the bores 224 are angularly disposed with respect to the horizontal and slope downwardly in a direction toward the body 162. Thus, gravity will cause the bushings 210 to slide in a direction toward the body 162 in order to assure that the clapper 188 will be supported by the hanger member 212 in a manner providing an efficient engagement thereof with the valve seat 186 in the closed position of the valve 160.

The valve body section 164 is generally similar to the body 104 and is provided with an enlarged portion 226 in the proximity of the clapper member 188 to provide clearance therefore during opening of the valve 160 as hereinbefore set forth. In addition, an access port 228 may be provided in the body 164 for facilitating access to the interior 176 thereof for bleeding pressure from the valve 160, or the like, as is well known. Of course, a suitable plug 230 may be removably secured in the port 228 for closing thereof during normal operating conditions for the valve 160 and suitable sealing means, such as an O-ring 232, may be interposed between the flanges 166 and 168 for precluding leakage of fluid therebetween. It will be apparent that the clapper member 188 and/or valve seat 186 may be repaired in the manner as hereinbefore set forth.

Referring now to FIGS. 8, 9 and 10, a modified valve is generally indicated at 234 comprising a valve body 236 having oppositely disposed aligned inlet and outlet ports 238 and 240, respectively, providing a fluid passageway through the body 236. The inlet and outlet ports 238 and 240 may be internally threaded as shown herein, or may be otherwise configured for facilitating installation of the valve 234 in a flow line (not shown) as is well known.

The bore 238 is enlarged at 242 to provide an annular shoulder 244 for receiving one end of a sleeve 246 thereagainst. Suitable sealing means, such as an O-ring 248, is interposed between the outer periphery of the sleeve 246 and the bore 242 for precluding leakage of fluid therebetween. The outer end 250 of the sleeve 246 extends into the interior 252 of the body 236 to provide a valve seat for the valve 234. A clapper member 254 generally similar to the clapper 188 is pivotally secured to the body 236 in a manner as will be hereinafter set forth and cooperates with the valve seat 250 to provide alternate open and closed positions for the valve 234. A suitable sealing member 256 is provided on the valve seat 250 for engagement with the clapper member 254 in the closed position of the valve for precluding leakage of fluid. Of course it will be apparent that the sealing member 256 may be disposed on the clapper member 254 rather than on the valve seat 250, if desired.

The clapper member 254 comprises a substantially disc shaped member 258 having a counterweight member 260 provided on the upstream side thereof and an angled arm member 262 provided on the opposite side thereof. A transversely extending bore 264 is provided in the outer end of the arm 262 for receiving a pivot shaft 266 therethrough. As hereinbefore set forth, the arm 262 may be keyed or otherwise secured to the outer periphery of the shaft 266 for simultaneous rotation therewith, or may be suitably journalled on the shaft for rotation about the longitudinal axis thereof, as is well known. The shaft 266 extends through a pair of spaced bushings 268 and 270 which are supported or retained in a hanger section generally indicated at 272.

A recess 274 having a substantially flat bottom surface 276 is provided in the body 236 spaced from the valve seat 250 for removably receiving the hanger section 272 thereon. In addition, a suitable set screw 278 extends from the recess 274 into engagement with an annular groove 280 provided around the outer periphery of the sleeve 246 for removably retaining the sleeve 246 within the bore 242.

The hanger section 272 comprises an elongated block member 282 having a pair of spaced bores 283 and 284 for receiving bolts 286 therethrough which are threadedly engagable with the surface 276 of the body 236 for removably securing the hanger section 272 in the recess 274. In addition, a transverse bore 285 is interposed between the bores 283 and 284 providing access to the screw 278. A pair of spaced outwardly extending bosses 288 and 290 are provided on the block 282 having aligned bores 279 and 281 for receiving the bushing 268 and 270, respectively, therein. The arm 262 is disposed between the bosses 288 and 290 and the clapper member 254 is thus pivotally secured within the body 236.

An access port 292 is provided in the upper portion of the valve body 236 in the proximity of the hanger section 272 and clapper member 254 for facilitating access thereto. The access port 292 is preferably threaded for removably receiving a suitable cover member 294 therein which may be easily removed for access to the hanger section 272, clapper 254 and valve seat 250 and suitable sealing means 296 is interposed between the cover 294 and body 236 for precluding leakage of fluid. The clapper 254 and sleeve 246 may be easily removed from the valve body 236 for repair or the like and may be easily reinstalled in the body 236. In addition, the hanger section 272 may be easily remodeled to compensate for any dimensional variance resulting from the repair of the clapper or valve seat.

From the foregoing it will be apparent that the present invention provides a novel check valve particularly designed and constructed for facilitating the repair and maintenance of the closure member and/or valve seat. The valve is provided with novel hanger means for removably securing the closure or clapper member within the valve, and for compensating for dimensional variances subsequent to any repair work, such as facing of either the valve clapper or valve seat.

Whereas the present invention has been described in particular relation to the drawings attached hereto, it should be understood that other and further modifications, apart from those shown or suggested herein, may be made within the spirit and scope of this invention.

What is claimed is:

1. A check valve comprising a separable housing, inlet and outlet ports provided in the housing for flow of fluid through the valve, valve seat means provided in the housing, closure means pivotally secured within the housing and cooperating with the valve seat means to provide alternate open and closed positions for the valve, hanger means provided in the housing for pivotally securing the closure member thereto, means cooperating between the hanger means and closure means to compensate for dimensional variances of the closure means and valve seat for assuring an efficient sealing of the valve in the closed position thereof, and wherein the hanger means comprises a plurality of sets of spaced arcuate fingers provided on the housing, said sets of arcuate fingers being circumferentially spaced with respect to the valve seat for selective orientation with respect to the closure means to provide said compensation for dimensional variances of the valve seat and closure means.

2. A check valve comprising a first housing member having an inlet port provided therein, a second housing member removably secured to the first housing member in substantial longitudinal alignment therewith and having an outlet port therein, a valve seat provided on said first housing member and extending into said second housing member, hanger means provided on said first housing, clapper means removably secured on said hanger means and pivotal in alternate directions away from and toward the valve seat to provide open and closed positions for the valve, said second housing being provided with an enlarged portion in the proximity of the clapper means for clearance thereof during opening of the valve, and means provided on said second housing cooperating with said hanger means for removably retaining said clapper means on said hanger means, and wherein said hanger means comprises a plurality of hanger members circumferentially spaced around the outer periphery of the valve seat, each of said hanger members having one end thereof open for removably receiving the clapper means therein, said hanger members being of variable dimensions whereby said first housing may be selectively orientated with respect to said second housing for positioning one hanger member in the upper portion thereof for supporting the clapper means in a manner to compensate for dimensional variances of the clapper means and valve seat.

* * * * *